United States Patent Office 3,120,881
Patented Feb. 11, 1964

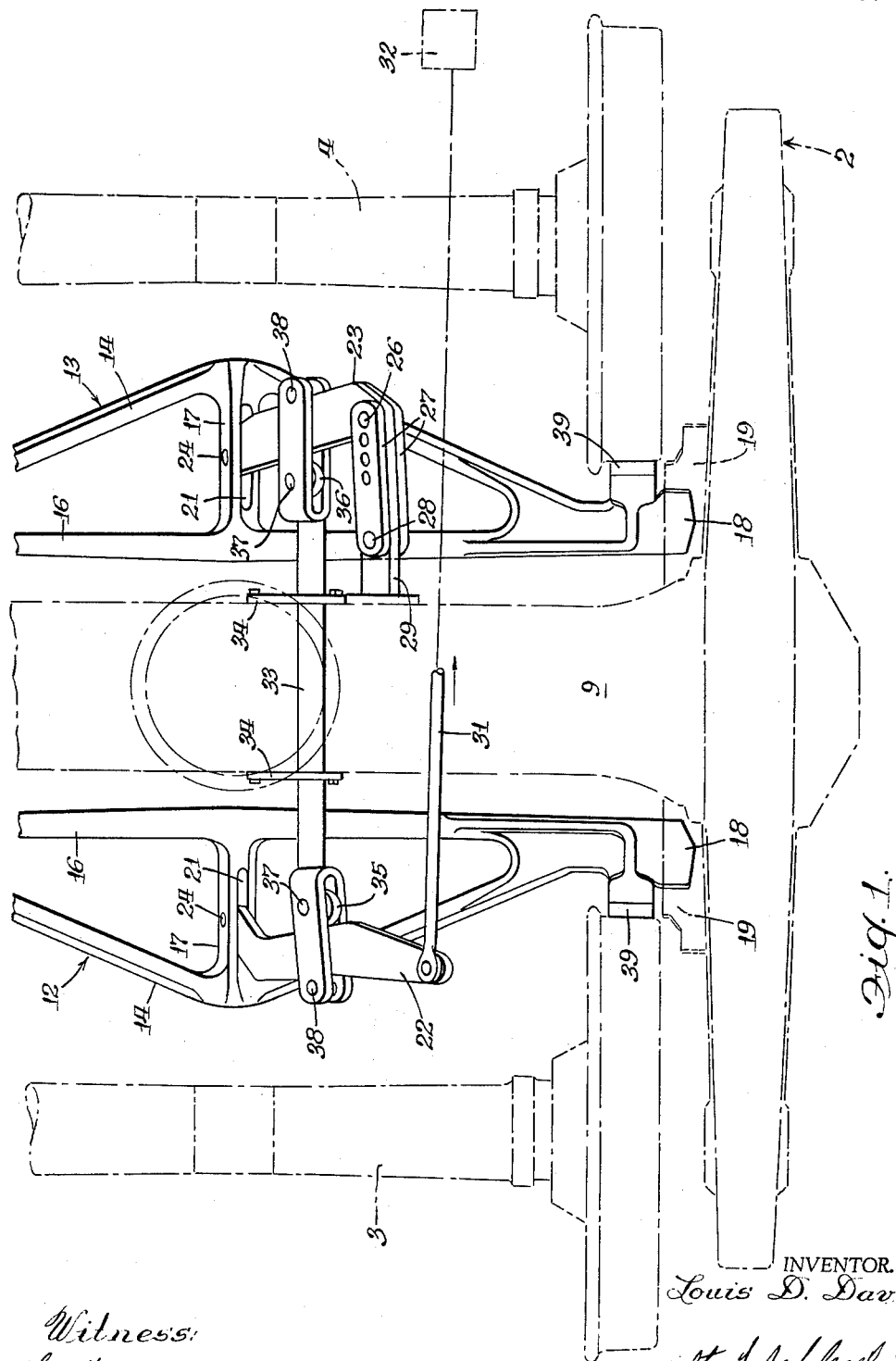

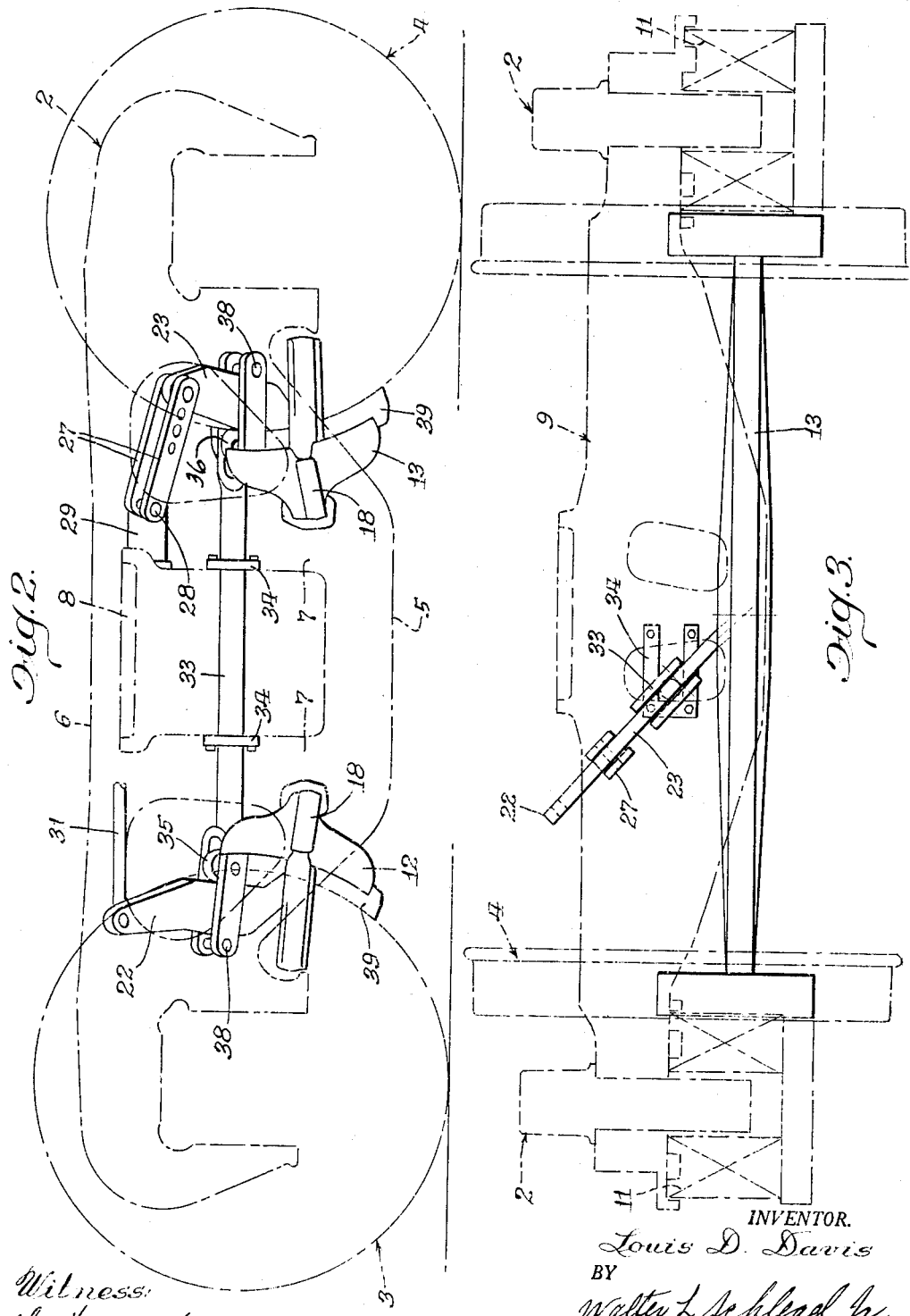

3,120,881
RAILWAY TREAD BRAKE ARRANGEMENT
Louis D. Davis, Chicago Heights, Ill., assignor to Amsted Industries Incorporated, Chicago, Ill., a corporation of New Jersey
Filed Apr. 5, 1962, Ser. No. 185,452
9 Claims. (Cl. 188—195)

This invention relates to brake arrangements for railway car trucks and more particularly to a brake arrangement in which the braking force varies responsive to the weight of the laden being transported on the truck.

Heretofore, brake riggings provided on railway trucks have been designed to exert a predetermined braking force during deceleration of the truck. The present invention contemplates the provision of a brake rigging adapted to provide a predetermined braking force when the truck is supporting a light load, and to provide a relatively greater braking force when the truck is supporting a relatively heavy load.

The invention further contemplates the provision of a railway truck brake arrangement in which the braking force exerted to decelerate the truck is automatically varied responsive to variations in loads supported on the truck.

The invention embodies other novel features, details of construction and arrangement of parts which are hereinafter set forth in the specification and claims and illustrated in the accompanying drawings, forming part thereof, wherein:

FIGURE 1 is a fragmentary top plan view of a four wheel railway car truck provided with a tread brake arrangement embodying features of the invention;

FIGURE 2 is a side elevation of the truck structure shown in FIGURE 1; and

FIGURE 3 is an end elevation of the truck structure.

Referring now to the drawings for a better understanding of the invention, a railway tread brake arrangement embodying features of the invention is shown as mounted for use on a conventional self-aligning four wheel railway car truck which is shown as comprising spaced truss type side frames 2 supported at their ends upon wheel and axle assemblies 3 and 4. Each side frame is shown as comprising tension and compression members 5 and 6 interconnected by spaced columns 7 to define a window 8 to receive one end of a bolster 9. The bolster interconnects the side frames and is resiliently supported at its ends upon groups of helical compression springs 11 seated on the tension members 5.

The tread brake arrangement is shown as comprising two truss type brake beams 12 and 13, each comprising tension and compression members 14 and 16 interconnected by a central strut 17 and provided at its ends with guide lugs 18 for sliding engagement in guide members 19 formed on the side frames. The struts 17 are formed with slots 21 to receive the lower ends of live and dead brake levers 22 and 23 which are pivotally connected to their respective struts by means of pivot pins 24.

The upper end of the dead brake lever 23 is pivotally connected at 26 to spaced links 27 which, in turn, are pivotally connected at 28 to a bracket 29 secured to the bolster 9. The upper end of the live brake lever 22 is connected to a pull rod 31 adapted to be operatively connected to and actuated by a conventional piston-cylinder power device 32.

A push rod 33 is mounted for axial and lateral movement in bearing brackets 34 secured to opposite sides of the bolster, the ends of the rod being bifurcated to receive the medial portions of the brake levers.

Rollers 35 and 36 are journaled on pins 37 provided on the rod 33 to engage the edges of the brake levers facing the bolster, and retainer pins 38 are provided on the ends of the rod to engage remote edges of the brake levers. Brake shoes 39 are provided on the ends of the brake beams 12 and 13 to frictionally engage the tread surfaces of their respective wheels to decelerate the truck.

In the operation of the tread brake arrangement thus shown and described to decelerate a truck, the power device acts through the pull rod 31 to pivot the live brake lever 22 in a counterclockwise direction about its roller 35 to move the brake beam 12 toward the wheel and axle assembly 3. The live brake lever also acts through the push rod 33 and dead brake lever 23 to move the brake beam 13 toward the wheel and axle assembly 4.

The brake shoes 39 are thereby frictionally engaged against their respective wheel treads with a predetermined equal force when the truck bolster supports an empty car body. When a loaded car body is supported on the truck bolster, the bolster springs 11 are compressed, thereby lowering the bolster 9 and push rod 33 relative to the brake levers 22 and 23. When the bolster and push rod are thus moved to a lower position, the brake levers exert a greater braking force against the brake beams due to the decrease in distance between the rollers 35 and 36 and their respective pivot pins 24. In other words, the braking force varies responsive to changes in the fulcrum points of the brake levers relative to their pivot pins 24, whereby a predetermined braking force is exerted when a railway car is unloaded, and a relatively greater braking force is exerted when the car is loaded.

I claim:

1. In a tread brake arrangement for a four wheel railway car truck having a bolster resiliently supported on side frames mounted on wheel and axle assemblies, two brake beams slidably supported on the side frames between said assemblies, brake shoes on said beams for frictional engagement against said assemblies, a dead brake lever pivotally connected at its lower end to one of said brake beams, a link pivotally connecting the upper end of said dead brake to the bolster, a live brake lever pivotally connected at its lower end to the other of said brake beams, a push rod slideably mounted on said bolster and interposed between medial portions of the brake levers to provide variable fulcrum points for the latter, and actuating means connected to the upper end of the live brake lever.

2. In a tread brake arrangement for a four wheel railway car truck having a bolster resiliently supported on side frames mounted on wheel and axle assemblies, two brake beams slidably supported on the side frames between said assemblies, brake shoes on said beams for frictional engagement against said assemblies, a dead brake lever pivotally connected at its lower end to one of said brake beams, a link pivotally connecting the upper end of said dead brake to the bolster, a live brake lever pivotally connected at its lower end to the other of said brake beams, a push rod mounted on said bolster and interposed between medial portions of the brake levers to provide variable fulcrum points for the latter, actuating means connected to the upper end of the live brake lever, and bearing means on said bolster supporting said push rod for axial and lateral movement.

3. In a tread brake arrangement for a four wheel railway car truck having a bolster resiliently supported for vertical movement on a truck frame mounted on spaced wheel and axle assemblies, two brake beams slidably mounted on the truck frame adjacent opposite sides of the bolster, live and dead brake levers pivotally connected at their lower ends to their respective brake beams, means pivotally connecting the upper end of the dead brake lever to the bolster, brake lever fulcrum means supported on the bolster slidably engaging medial portions of the brake levers, and brake actuating means connected to the upper end of the live brake lever.

4. In a tread brake arrangement for a four wheel railway car truck having a bolster resiliently supported for vertical movement on a truck frame mounted on spaced wheel and axle assemblies, two brake beams slidably mounted on the truck frame adjacent opposite sides of the bolster, live and dead brake levers pivotally connected at their lower ends to their respective brake beams, means pivotally connecting the upper end of the dead brake lever to the bolster, brake lever fulcrum means supported on the bolster slidably engaging medial portions of the brake levers, brake actuating means connected to the upper ends of the live brake lever, said brake lever fulcrum means comprising a push rod, and rollers journalled on opposite ends of the push rod to engage their respective brake levers.

5. In a tread brake arrangement for a four wheel railway car truck having a bolster resiliently supported for vertical movement on a truck frame mounted on spaced wheel and axle assemblies, two brake beams slidably mounted on the truck frame adjacent opposite sides of the bolster, live and dead brake levers pivotally connected at their lower ends to their respective brake beams, means pivotally connecting the upper end of the dead brake lever to the bolster, brake lever fulcrum means supported on the bolster slidably engaging medial portions of the brake levers, brake actuating means connected to the upper end of the live brake lever, said brake lever fulcrum means comprising a push rod having bifurcated ends straddling said brake levers.

6. In a tread brake arrangement for a four wheel railway car truck having a bolster resiliently supported for vertical movement on a truck frame mounted on spaced wheel and axle assemblies, two brake beams slidably mounted on the truck frame adjacent opposite sides of the bolster, live and dead brake levers pivotally connected at their lower ends to their respective brake beams, means pivotally connecting the upper end of the dead brake lever to the bolster, brake lever fulcrum means supported on the bolster slidably engaging medial portions of the brake levers, said brake lever fulcrum means comprising a push rod having bifurcated ends straddling said brake levers, and rollers journalled on the ends of the push rod to engage the brake levers.

7. In a tread brake arrangement for a four wheel railway car truck having a bolster resiliently supported for vertical movement on a truck frame mounted on spaced wheel and axle assemblies, two brake beams slidably mounted on the truck frame adjacent opposite sides of the bolster, live and dead brake levers pivotally connected at their lower ends to their respective brake beams, means pivotally connecting the upper end of the dead brake lever to the bolster, brake lever fulcrum means supported on the bolster slidably engaging medial portions of the brake levers, brake actuating means connected to the upper end of the live brake lever, said brake lever fulcrum means comprising a push rod having bifurcated ends straddling said brake levers, and retainer pins mounted on and closing said bifurcated end of the push rod.

8. In a tread brake arrangement for a four wheel railway car truck having a bolster resiliently supported for vertical movement on a truck frame mounted on spaced wheel and axle assemblies, two brake beams slidably mounted on the truck frame adjacent opposite sides of the bolster, live and dead brake levers pivotally connected at their lower ends to their respective brake beams, means pivotally connecting the upper end of the dead brake lever to the bolster, brake lever fulcrum means supported on the bolster slidably engaging medial portions of the brake levers, brake actuating means connected to the upper end of the live brake lever, said brake lever fulcrum means comprising a push rod having bifurcated ends straddling said brake levers, a bearing means on said bolster to guide said push rod for axial and lateral movement.

9. In a tread brake arrangement for a four wheel railway car truck having a bolster resiliently supported for vertical movement on a truck frame mounted on spaced wheel and axle assemblies, two brake beams slidably mounted on the truck frame adjacent opposite sides of the bolster, live and dead brake levers pivotally connected at their lower ends to their respective brake beams, means pivotally connecting the upper end of the dead brake lever to the bolster, brake lever fulcrum means supported on the bolster slidably engaging medial portions of the brake levers, brake actuating means connected to the upper end of the live brake lever, said brake lever fulcrum means comprising a push rod having bifurcated ends straddling said brake levers, a bearing means on said bolster to guide said push rod for axial and lateral movement, said brake levers being in a common plane and inclined toward one side of the truck frame.

References Cited in the file of this patent
UNITED STATES PATENTS
2,815,092   Baselt ------------------ Dec. 3, 1957
FOREIGN PATENTS
631,803   Germany --------------- June 27, 1936